(12) United States Patent
Endo

(10) Patent No.: US 6,795,059 B2
(45) Date of Patent: Sep. 21, 2004

(54) OPERATING DEVICE FOR CONTROLLING ELECTRONIC DEVICES UTILIZING A TOUCH PANEL

(75) Inventor: Keisuke Endo, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 7 days.

(21) Appl. No.: 09/929,372

(22) Filed: Aug. 13, 2001

(65) Prior Publication Data

US 2002/0067345 A1 Jun. 6, 2002

(30) Foreign Application Priority Data

Aug. 17, 2000 (JP) ........................................ 2000-247310

(51) Int. Cl.⁷ ................................................ G09G 5/00
(52) U.S. Cl. ...................................... 345/173; 345/810
(58) Field of Search ................................ 345/173, 178, 345/716, 727, 729, 773, 864–866, 179, 168–172, 810, 840; 341/21–23, 20

(56) References Cited

U.S. PATENT DOCUMENTS

| 5,012,280 A | * | 4/1991 | Tsutsumi et al. ............. 399/81 |
| 5,189,732 A | * | 2/1993 | Kondo ........................ 345/840 |
| 5,627,567 A | * | 5/1997 | Davidson ..................... 345/173 |
| 5,877,751 A | * | 3/1999 | Kanemitsu et al. ......... 345/173 |
| 6,023,265 A | | 2/2000 | Lee ............................. 345/173 |

FOREIGN PATENT DOCUMENTS

| JP | 05-066886 | * | 3/1993 | .......... G06G/3/033 |
| JP | 05-073196 | * | 3/1993 | .......... G06G/3/023 |
| JP | 08-063289 | * | 3/1996 | .......... G06F/3/033 |

* cited by examiner

Primary Examiner—Alexander Eisen
(74) Attorney, Agent, or Firm—Brinks Hofer Gilson & Lione

(57) ABSTRACT

An operating device for controlling electronic devices that are controlled by displaying plural operation keys on a touch panel is shown. The operating device stores the correspondence of a key code with an area on the touch panel, and outputs the key code corresponding to the area including a designated point. When there is a key that invalidates an operation input to the key, the operating device expands the areas of the keys adjacent thereto. Even if a user presses a border area between a desired key and its adjacent key, the operating device will judge that the desired key has been pressed.

15 Claims, 5 Drawing Sheets

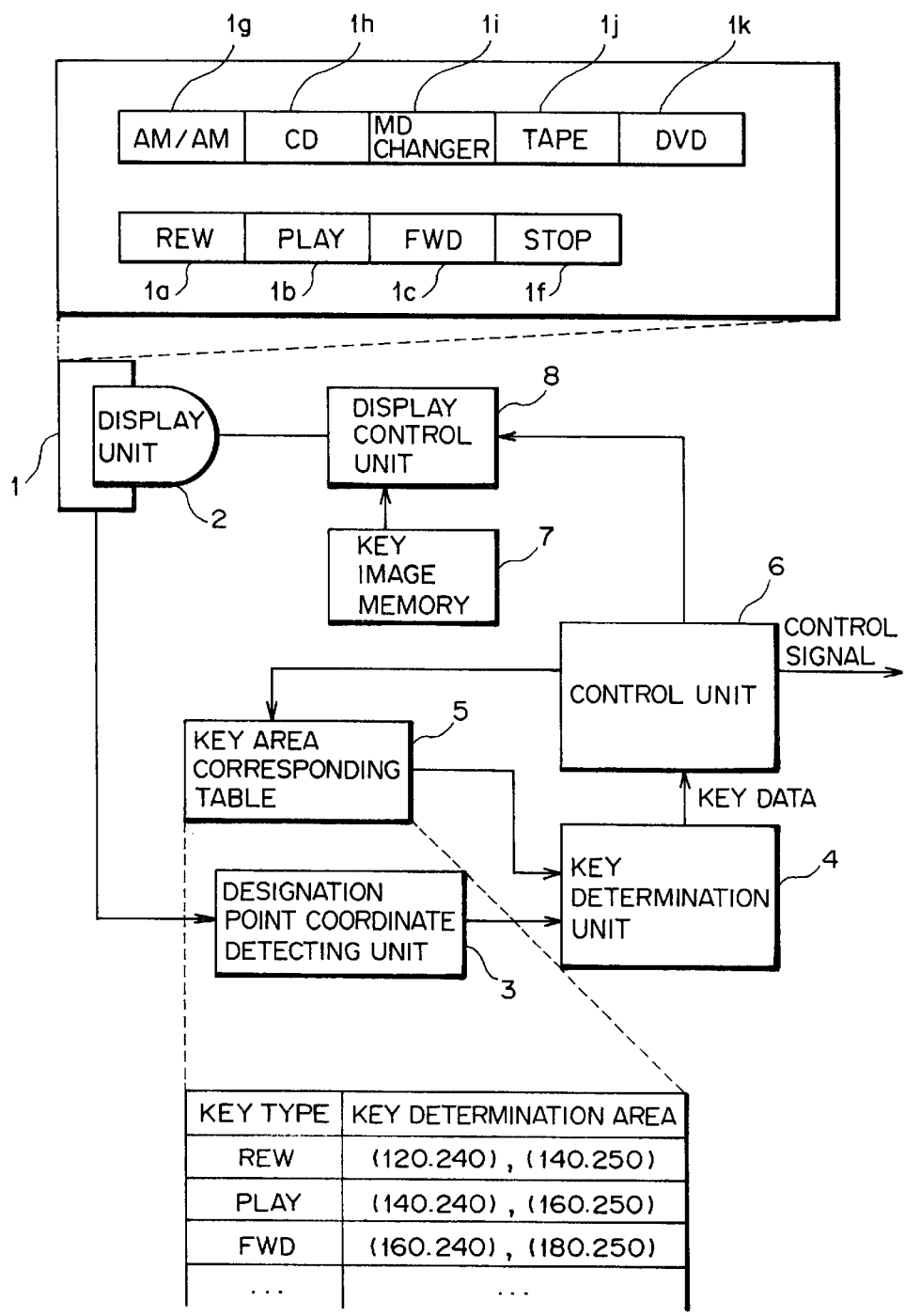

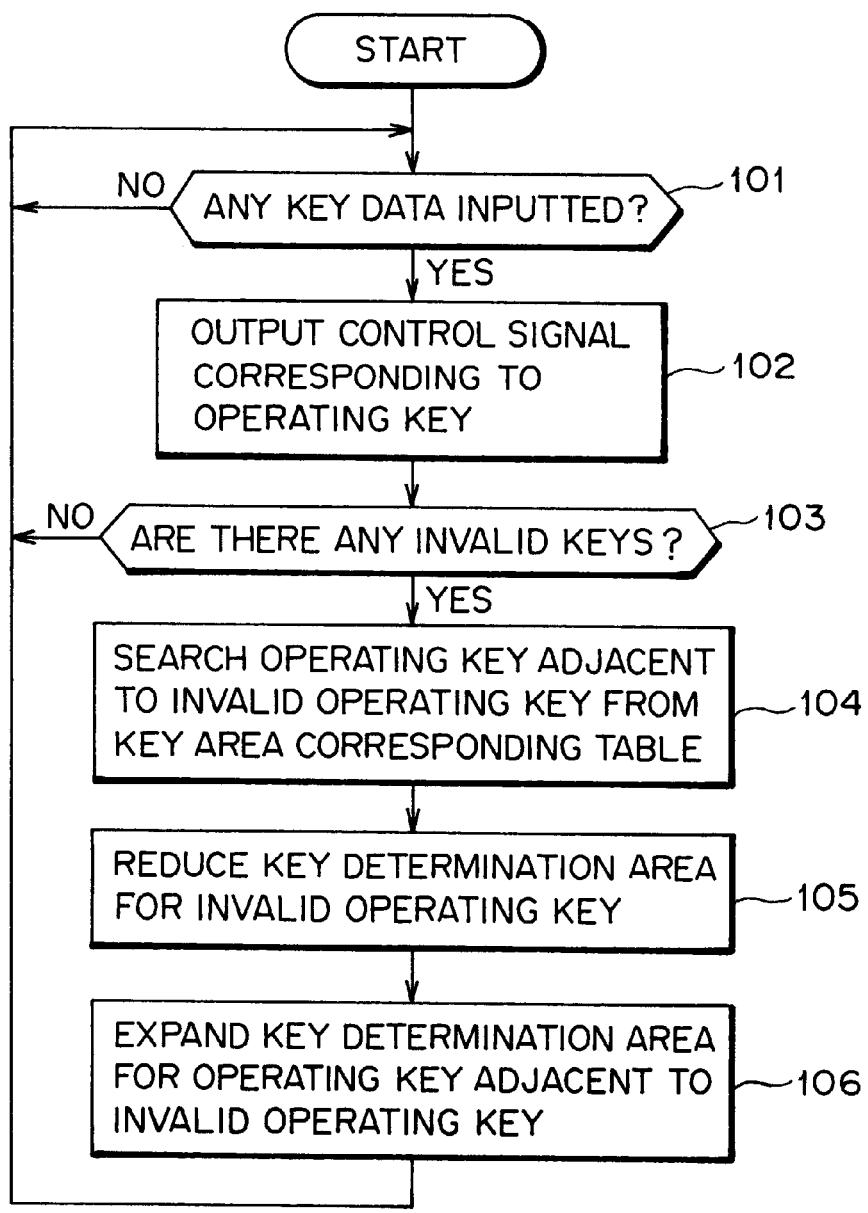

OPERATING DEVICE FOR CONTROLLING ELECTRONIC DEVICES UTILIZING A TOUCH PANEL

BACKGROUND OF THE INVENTION

1. Field of the Invention

The present invention relates to an operating device for controlling electronic devices, specifically to an operating device suitable for controlling electronic devices that are controlled by displaying a plurality of operation keys on a touch panel.

2. Related Art

Various musical media and electronic devices, CD players and MD players, cassette tape players and navigation equipment have appeared and are being loaded inside the vehicles. In order to use the individual electronic devices, a user must utilize many operating buttons to operate these electronic devices, thereby making the operation complicated. For this reason, the images of operating buttons (hereinafter called the operating keys) of each electronic device are displayed on the touch panel and the displayed operating keys enable the user to select the operation, thereby solving the complexity of the operation.

FIG. 5 represents an example of the touch panel type operating device. As shown in FIG. 5, a touch panel displays a selection key 51 for selecting an audio device (FM/AM tuner, CD player, MD player, and cassette tape player), operating key 52 ("REW", "PLAY", "FWD") for the audio device selected by the selection key 51. The user can select the desired audio device with the selection key 51 and operate it by touching the operating key 52 displayed by this selection (this Figure represents the selection of the cassette tape player).

As mentioned above, the touch panel type operating device improves the operation of each operating button provided for each electronic device by displaying the selection keys for selecting each of the electronic devices, displaying the operating keys for operating each electronic device on the touch panel and maneuvering the operating keys displayed on the touch panel, making it possible to operate every electronic device, thereby solving the complexity of maneuvering each operating button arranged for the individual electronic devices. However, the display area of each operating key displayed on the touch panel is limited by the size of the touch panel. Therefore, as shown in FIG. 5 (a), each operating key is displayed close to each other, which may cause an erroneous operation of pressing other operating keys adjacent to the intended one. Also, in case of which the display area on the touch panel is large, as shown in FIG. 5 (b), a space of a certain size could be established between the displayed operating keys, but at any event, a sufficient display area for the operating keys to prevent the erroneous operation cannot be secured.

As a result, it happens quite often that when the user presses either one of the operating keys displayed on the touch panel, the user presses an area near the border of the desired key and its adjacent key. For example, in FIGS. 5 (a), 5 (b), when the "PLAY" key has already been pressed and the audio device is operating the "PLAY", the user could press an area near the border of the "PLAY" key and the "FWD" key when trying to press the "FWD" key. As a result, the judgment that the "PLAY" key has been pressed may occur.

In a state of the "PLAY" operation, pressing the "PLAY" key repeatedly is meaningless. Therefore, when it is judged that the operation has been done repeatedly, as mentioned above, usually, the operation of the audio device cannot be changed as if there was not any operation at all. This is troublesome because since the user has to press the "FWD" key again.

SUMMARY OF THE INVENTION

The present invention has been made in view of the foregoing circumstances, and it is therefore an object of the invention to provide an operating device with an improved operating performance by making it possible to judge that the desired key has been pressed, even when a user presses an area on the border of the desired key and the adjacent key.

The present invention relates to an operating device to which a key input is received by pressing the operating keys displayed on the touch panel, which comprises a display unit that displays the operating keys on the touch panel, a designated point coordinate detecting unit that detects the location pressed on the touch panel, a key area corresponding table that memorizes the correspondence of a key code with an area on the touch panel, a key determination unit that outputs the key code corresponding to the area including the designated point, and a control unit that expands the area of the adjacent key, when there is a key that invalidates an operation input thereto depending on the state of a controlled unit. In this case, the control unit can expand the key area adjacent to the invalid key and reduce the area of the invalid key as well. With the operating device of the present invention, the desired key can be judged as being pressed, even when the user presses an area on the border of the desired key and the adjacent key, thereby improving the operational performance of the operating device.

BRIEF DESCRIPTION OF THE DRAWINGS

Preferred embodiments of the present invention will be described in detail based on the followings, wherein:

FIG. 3 is a block diagram illustrating the construction of the operating device according to one embodiment of the present invention;

FIG. 4 is a flow chart that explains the operation of the operating device according to one embodiment of the present invention.

DESCRIPTION OF PREFERRED EMBODIMENTS

Figure 1A:
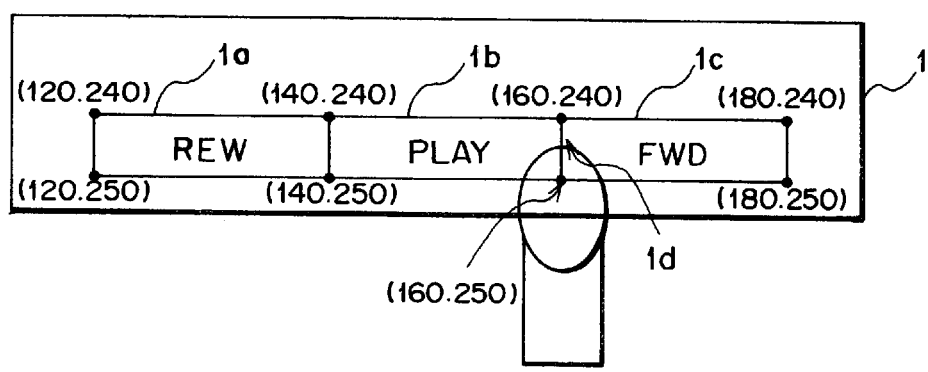
FIG. 1 is a schematic drawing of an operating device according to one embodiment of the present invention.
Figure 1B:
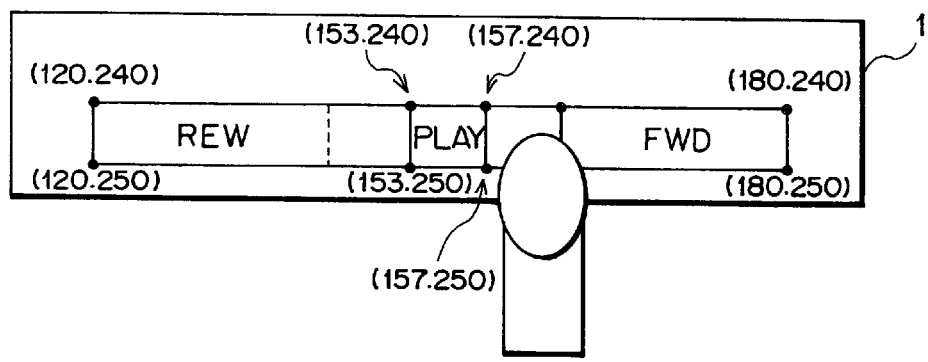
Figure 2A:
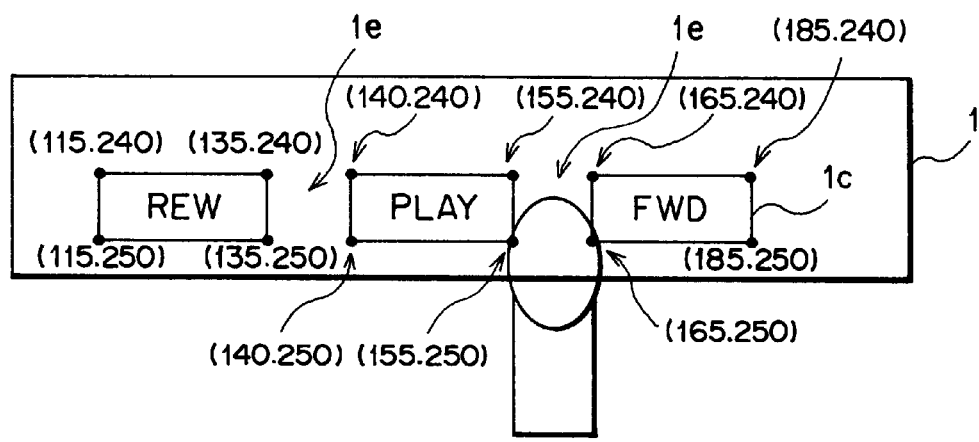
FIG. 2 is a schematic drawing of the operating device according to one embodiment of the present invention.
Figure 2B:
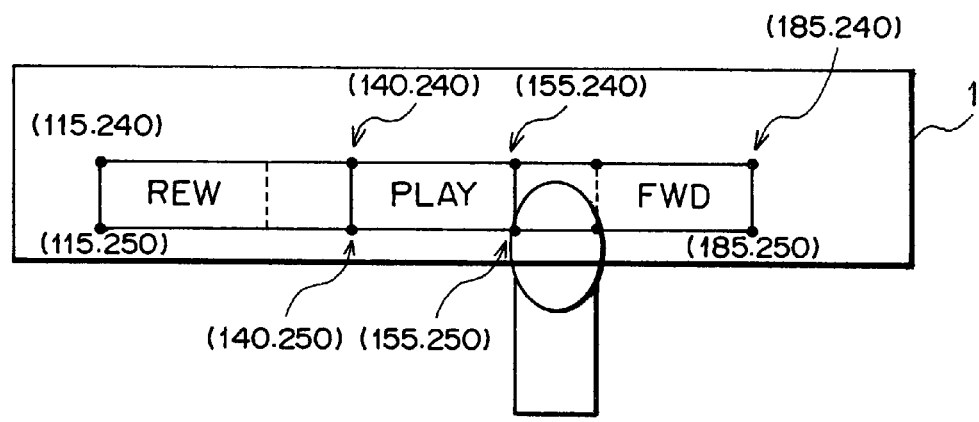
Figure 5A:
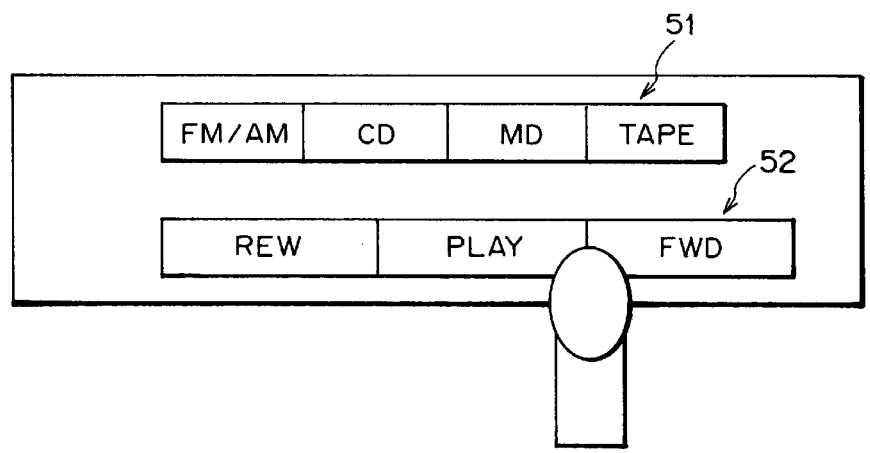
FIG. 5 is a chart illustrating a touch panel of the conventional operating device.
Figure 5B:
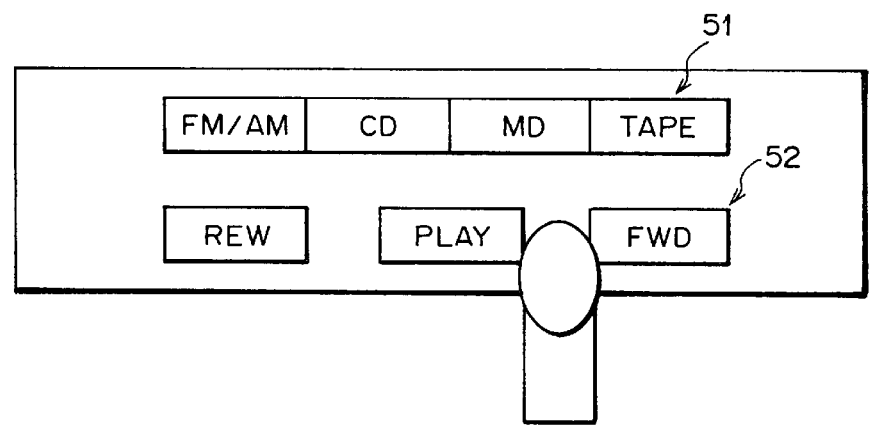

The embodiments of the present invention will be described with reference to FIG. 1 through FIG. 4. Here, FIG. 1 and FIG. 2 are the schematic drawings of the operating device according to one embodiment of the present invention. FIG. 3 is a block diagram illustrating the construction of the operating device according to one embodiment of the present invention. FIG. 4 is a flow chart that explains the operation of the operating device according to one embodiment of the present invention.

An embodiment of the present invention will be described with reference to FIG. 1 and FIG. 2. FIG. 1 and FIG. 2 are the schematic drawings that explain the operating device according to one embodiment of the present invention. Also, both FIG. 1 and FIG. 2 represent the state in which the user has already pressed the "PLAY" key, and the audio device (for example, the cassette tape player) desired by the user is in the state of "PLAY" operation, and also, the state in which the user has pressed the border of the "PLAY" key and the "FWD" key, when trying to press the "FWD" key.

FIG. 1 (*a*) represents an example of operating keys 1*a*, 1*b*, and 1*c* displayed adjacent to each other on a touch panel 1. The four corners of each key are represented by the coordinates. Normally, the key determination area for each of the operating keys 1*a*, 1*b*, and 1*c* coincides with the key display area. FIG. 1(*b*) is a descriptive drawing of the key area in the state of "PLAY" operation. And the key determination area (coordinate (160,240), (180,250)) of the "FWD" key 1*c* as the operating key adjacent to the "PLAY" key 1*b*, which is meaningless when pressed during the "PLAY" operation, is expanded to the key determination area (coordinate (157, 240), (180,250)) represented in FIG. 1 (*b*), and at the same time the key determination area (coordinate (120, 240), (140, 250)) of the "REW" key 1*a* is expanded to the key determination area (coordinate (120,240), (153, 250)) represented in FIG. 1 (*b*). Also, the key determination area of the "PLAY" key, which is invalid when pressed, is reduced (from coordinate (140, 240), (160, 250) to coordinate (153, 240), (157, 250)). As a result, even when the user presses a border area 1*d* as shown in FIG. 1 (*a*), the desired operating key, that is, the "FWD" key 1*c* will be determined as having been pressed.

Also, FIG. 2 (*a*) is a drawing representing an example of a touch panel 1, on which the operating keys 1*a*, 1*b*, and 1*c* each are displayed with a certain spacing 1*e*, and the four corners of each key are given the coordinates, in the same manner as in FIG. 1 (*a*). Normally, the key determination area for each of the operating keys 1*a*, 1*b*, and 1*c* coincides with the key display area. FIG. 2 (*b*) is a descriptive drawing of the key area in the state of "PLAY" operation. The key determination area (coordinate (165,240), (185,250)) of the "FWD" key 1*c* as the operating key adjacent to the "PLAY" key 1*b*, which is meaningless when pressed during the "PLAY" operation, is expanded to the key determination area (coordinate (155, 240), (185,250)) represented in FIG. 2 (*b*), and at the same time the key determination area (coordinate (115, 240), (135, 250)) of the "REW" key 1*a* is expanded to the key determination area (coordinate (115, 240), (140, 250)) represented in FIG. 2 (*b*). As a result, even when the user presses the border area 1*e* as shown in FIG. 2 (*a*), the desired operating key, that is, the "FWD" key 1*c* will be determined as having been pressed.

An embodiment of the present invention is described with reference to FIG. 3. FIG. 3 represents the block diagram illustrating the construction of the operating device according to an embodiment of the present invention. Here, in FIG. 3, a touch panel 1, a display unit 2 that displays the image of the operating keys and others on the touch panel 1, a designation point coordinate detecting unit 3 that detects the location of the touch panel 1 that the user have pressed, a key determination unit 4 that outputs the key code corresponding to the area that includes the designated point on the touch panel 1, a key area corresponding table 5, a control unit 6, a key image memory 7 that stores images of the buttons (hereinafter called the selection keys) for selecting the operating keys and each audio device displayed in the display unit 2, and a display control unit 8 that controls the display unit 2 are shown.

The touch panel 1 serves as a display unit that displays the operating keys and the selection keys and as an input device for a user to select a key. The touch panel 1 is connected to the display unit 2 and the designation point coordinate detecting unit 3. The display unit 2 is designed to display the operating keys 1*a* through 1*d*, and the selection keys 1*g* through 1*k* on the touch panel 1. The display unit 2 is connected to the display control unit 8.

The designation point coordinate detecting unit 3 is designed to detect the location that the user has pressed on the touch panel 1, which is connected to the touch panel 1 and the key determination unit 4. Also, the designation point coordinate detecting unit 3 outputs the pressed point as a coordinate data, when the user presses the touch panel 1.

The key determination unit 4 is designed to output the key code corresponding to the area that includes the designated point (key designation area) and is connected to the designation point coordinate detecting unit 3, key area corresponding table 5, and control unit 6. The coordinate data outputted from the designation point coordinate detecting unit 3 is inputted to the key determination unit 4. When this coordinate data is inputted, the key determination unit 4 refers to the key area corresponding table 5 that discriminates which operation the user has selected, and outputs the key code.

The key area corresponding table 5 is a table on which the correspondence between the key code and the area on the touch panel 1 is recorded, and it is connected to the key determination unit 4 and the control unit 6. The key area corresponding table 5 stores the key code outputted from the key determination unit 4 for each area on the touch panel 1. For example, as the coordinate data (for example, (130, 245) within the area represented by a diagonal coordinate (120, 240), (140, 250) on the touch panel 1 is inputted, the key determination unit 4 determines that the "REW" has been operated, and outputs the key code corresponding to the "REW". This area determined for each operation key will hereinafter be called the key determination area.

The control unit 6 is designed to control the audio devices connected to the operating device of one embodiment of the present invention based on the key codes. The control unit 6 is connected to the key area corresponding table 5, key determination unit 4, and display control unit 8, and also, to the audio devices that the control unit 6 controls (such as CD player, MD player, cassette tape player, DVD player, etc.), which are not illustrated in the drawing. The control unit 6 receives the key code outputted from the key determination unit 4. Also, this control unit 6 changes the key determination area written on the key area corresponding table 5 on the basis of this key code, and controls the display control unit 8.

The display control unit 8, controlling the display unit 2, controls various kinds of images displayed on the touch panel 1, and it is connected to the display unit 2, key image memory 7, and control unit 6.

The operation process of the operating device of one embodiment of the present invention will be described, referring to the flow chart represented in FIG. 4. First, as a user presses the "PLAY" key 1*b* on the touch panel 1, the designation point detecting unit 3 detects the coordinate of the pressed location and inputs the coordinate data into the key determination unit 4. The key determination unit 4 searches for that which key determination area recorded on the key area corresponding table 5 includes the inputted coordinate data. Detecting that the user has pressed the "PLAY" key 1*b*, the key determination unit 4 inputs the key code corresponding to the "PLAY" key 1*b* to the control unit 6 (Act 101). Receiving the key code, the control unit 6 outputs a control signal according to the operating key to the audio device (Act 102).

Then, the control unit 6 checks if a key invalidated by the key code input in Act 101 has newly occurred (Act 103). Here, since the "PLAY" key 1b has already been pressed, it will become an operating key that does not operate when pressed again, that is, an invalid operating key when pressed repeatedly. Therefore, the control unit 6 judges that the invalid key is present. Then, the control unit 6 searches for the operating key adjacent to the invalid operating key (the "PLAY" key) from the key area corresponding table 5 (Act 104). Here, the operating keys adjacent to the invalid key are the "FWD" key 1c and the "RWD" key 1a. Next, the control unit 6 reduces the key determination area of the invalid operating key, namely, the "PLAY" key 1b (Act 105). As shown in FIG. 1, for example, the control unit 6 reduces the key determination area from (140, 240), (160, 250) to (153, 240), (157, 250).

The control unit 6 expands the key determination areas of the operating keys adjacent to the invalid operating key, that is, the "FWD" key 1c and the "RWD" key 1a (Act 106). As shown in FIG. 1, for example, the control unit 6 expands the key determination area of the "FWD" key 1c from (160, 240), (180, 250) to (157, 240), (180, 250), and expands the key determination area of the "REW" key 1a from (120, 240), (140, 250) to (120, 240), (153, 250).

As a result of the operation acts 101 through 106, the key determination areas of the operating keys adjacent to the invalid operating key are established beyond the original border areas. Therefore, even when the user happens to press an area near the border area 1d, the key determination unit 4 determines that the operation is for the "FWD" key being the desired operating key. Therefore, even when the user presses a border area between the desired key and the adjacent key, it is determined that the desired key has been pressed, whereby the operational performance of the operating device can be enhanced.

In the above embodiment, when there is a key that invalidates an operation input thereto depending on the state of the controlled device, the control unit 6 is designed to reduce the key determination area of the key, and to expand the key determination areas of the adjacent keys. However, there is also another processing method, such as expanding the key determination areas of the keys adjacent to the invalid key and deleting the key determination area of the invalid key at the same time. By this method, when the user presses a border area between the desired key and the adjacent key, it can be determined that the desired key has been pressed, thereby enhancing the operational performance of the operation device in the same manner as in the above embodiment.

Furthermore, in the above embodiment, the description has presented the example of the operating keys of the cassette tape player. However, when the invention is applied to the selection keys 1g through 1k, for example, when the selection key 1h (the "CD" key) has been pressed, the key determination areas of the selection keys (1g and 1i, in this example) adjacent to this selection key 1h will be expanded in the same manner as in the above embodiment. Thereby, even when the user presses a border area of the desired key and one of its adjacent keys, the desired key will be determined to have been pressed, thereby improving the operational performance of the operating device. Also, in the same manner, the alternative method mentioned above can be applied to this case, that is, expanding the key determination areas of the keys adjacent to the invalid key while deleting the key determination area of the invalid key. By this method, in case the user presses a border area between the desired key and the adjacent keys, the desired key will be determined to have been pressed, whereby the operational performance of the operating device can be enhanced.

Further, in the above embodiment, when there is a key that invalidates an operation input thereto depending on the state of the controlled device, the control unit 6 is configured to reduce the key determination area of the invalid key, to expand the key determination areas of the adjacent keys, and to delete the key determination area of the invalid key. However, the same can be applied to the operating key that is invalid from the beginning when displayed (for example, the "STOP" key of the cassette tape player), that is, reducing the key determination area of this operating key and expanding the key determination areas of the operating keys adjacent to this operating key at the same time. Alternatively, the key determination area of the other operating key adjacent to the operating key that is invalid from the beginning when displayed may be expanded, and at the same time the key determination area of this invalid operating key may be deleted.

According to one embodiment of the present invention being thus described, when there is a key that invalidates an operation input thereto, the key determination areas of the keys adjacent to this key are expanded, or the areas of the keys adjacent to this invalid key are expanded and the area of this invalid key is reduced at the same time. Thereby, even if the user presses a border area of the desired key and its adjacent keys, the desired key will be determined to have been pressed, whereby the operational performance of the operating device can be enhanced.

What is claimed is:

1. An operating device for a touch panel, comprising:
   a plurality of operating keys displayed on said touch panel;
   a plurality of key determination areas of said plurality of operating keys; and
   a control unit operable to expand and reduce at least one of said plurality of key determination areas;
   wherein said control unit reduces the key determination area of an operating key when said operating key is initially invalid.

2. An operating device as claimed in claim 1, wherein the touch panel displays the operating keys and specific images.

3. An operating device as claimed in claim 1, wherein the control unit reduces the key determination area of the operating key that invalidates an operation input thereto.

4. An operating device as claimed in claim 3, wherein the control unit is able to further delete the key determination area of the operating key that invalidates an operation input thereto.

5. An operating device as claimed in claim 1, wherein, when there is an operating key that is invalid from a beginning when displayed on the touch panel, the control unit expands the key determination areas of the operating keys adjacent to the operating key.

6. An operating device as claimed in claim 5, wherein, when there is an operating key that is invalid from a beginning when displayed on the touch panel, the control unit is able to further delete the key determination area of the operating key.

7. An operating device for a touch panel, comprising:
   a display unit operable to display a plurality of operating keys on said touch panel;
   a designation point coordinate detecting unit in communication with said touch panel and operable to detect a location pressed on said touch panel;
   a key determination unit in communication with said designation point coordinate detecting unit and operable to output key codes corresponding to key determination areas of operating keys;

a key area corresponding table in communication with said key determination unit and operable to store a correspondence between a key code and a key determination area on the said panel; and a control unit in communication with said key area corresponding table and operable to reduce a key determination area of an operating key and expand key determination areas of operating keys adjacent to said operating key.

8. An operating device as claimed in claim 7, wherein the designation point coordinate detecting unit outputs a coordinate data corresponding to a point on the touch panel pressed by a user.

9. An operating device as claimed in claim 7, wherein, when there is the operating key that invalidates an operation input thereto depending on the state of the controlled device, the control unit is able to further delete the key determination area of the operating key.

10. A method of changing key determination areas on a touch panel comprising the acts of:

displaying a plurality of operating keys on said touch panel;

providing at least one key determination area corresponding with at least one of said plurality of operating keys;

identifying an invalid operating key;

reducing a key determination area that corresponds to said invalid operating key; and expanding said at least one key determination area.

11. A method of changing key determination areas of an operating device as claimed in claim 10, further comprising the step of reducing the key determination area of the operating key that invalidates an operation input thereto.

12. A method of changing key determination areas of an operating device as claimed in claim 11, further comprising the step of deleting the key determination area of the operating key that invalidates an operation input thereto.

13. A method of changing key determination areas of an operating device as claimed in claim 10, further comprising, when there is an operating key that is invalid from a beginning when displayed on the touch panel, the step of expanding the key determination areas of the operating keys adjacent to the operating key.

14. A method of changing key determination areas of an operating device, as claimed in claim 10, further comprising, when there is an operating key that is invalid from a beginning when displayed on the touch panel, the step of reducing the key determination area of the invalid operating key.

15. A method of changing key determination areas of an operating device as claimed in claim 14, further comprising, when there is an operating key that is invalid from a beginning when displayed on the touch panel, the step of deleting the key determination area of the invalid operating key.

* * * * *